United States Patent [19]
Duncan

[11] Patent Number: 5,433,560
[45] Date of Patent: Jul. 18, 1995

[54] APPARATUS FOR DRILLING HOLES IN A WORKPIECE

[76] Inventor: Ronnie J. Duncan, 1615 N. Ashland, E. Wenatchee, Wash. 98802

[21] Appl. No.: 193,711

[22] Filed: Feb. 9, 1994

[51] Int. Cl.⁶ .............................................. B23B 51/04
[52] U.S. Cl. .................................. 408/206; 408/208
[58] Field of Search .............. 408/204, 206, 207, 208, 408/209, 703

[56] References Cited

U.S. PATENT DOCUMENTS

| | | | |
|---|---|---|---|
| 1,448,697 | 3/1923 | Misener | 408/206 |
| 1,449,790 | 3/1923 | Sprague | 408/206 |
| 3,220,449 | 11/1965 | Franklin | 408/204 |
| 3,262,474 | 7/1966 | Enders | 408/209 |

FOREIGN PATENT DOCUMENTS

| | | | |
|---|---|---|---|
| 234301 | 8/1959 | Australia | 408/204 |
| 2410120 | 9/1975 | Germany | 408/206 |
| 238675 | 8/1925 | United Kingdom | 408/206 |
| 639315 | 6/1950 | United Kingdom | 408/204 |

Primary Examiner—Daniel W. Howell
Attorney, Agent, or Firm—Mark Zovko

[57] ABSTRACT

A hole cutting apparatus for use with a conventional drill and chuck. The apparatus features a self feed pilot bit and quick change drill bits which store on the apparatus. Hollow drill bits are provided which fit over a pilot bit and are fastened to the apparatus with a quick release pin. The pilot bit centers on the hole to be cut and the drill bit is used to cut a circular perimeter slot until through the workpiece. The apparatus fits in the chuck of a standard drill. The apparatus requires a relatively low torque from the drill motor to drill a large size hole when compared to conventional drilling systems.

7 Claims, 1 Drawing Sheet

U.S. Patent July 18, 1995 5,433,560
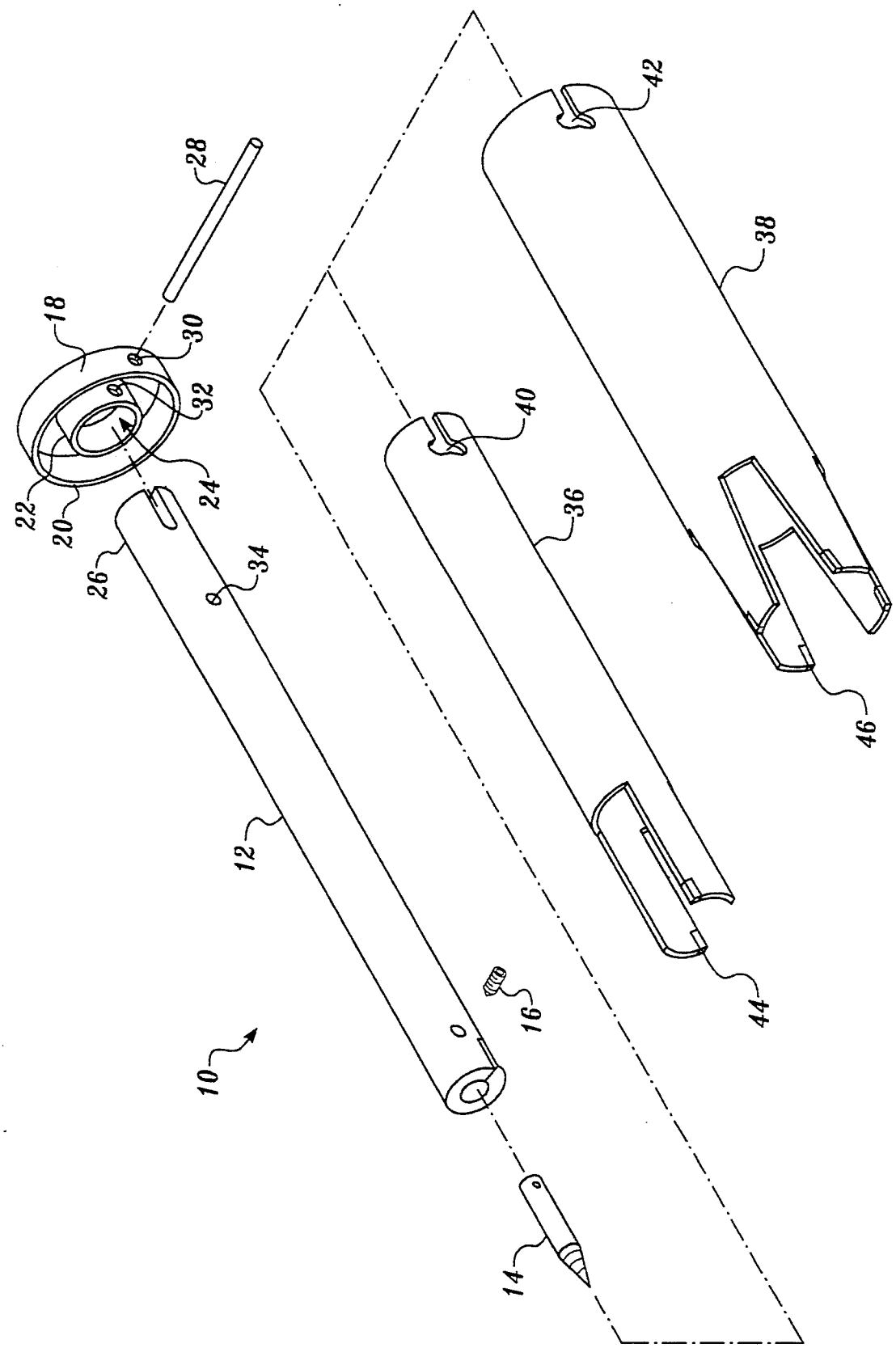

APPARATUS FOR DRILLING HOLES IN A WORKPIECE

BACKGROUND OF THE INVENTION

1. Field of the Invention

This invention relates in general to apparatus for drilling holes and more particularly to a construction drill set for use with a conventional drill and chuck which features a self feed pilot bit and easily changed drill bits capable of drilling relatively large size holes.

2. Discussion of the Prior Art

The present invention relates to drilling relatively large holes in wood or other material. In construction of buildings, many 1"-3" holes are required which in many cases need to be made through more than one 2" plate. Conventional drills use auger bits which remove all of the workpiece material within the boundaries of the hole as chips. Several problems are inherent in the conventional system. Self-feeding auger bits have the diameter of the required hole size, and remove the entire hole area from the workpiece, as mentioned above. These devices require a larger amount of torque as the size of the hole increases. As the size of the hole increases and the hardness of the workpiece increases, large amounts of torque are required from the drill motor. At certain hole sizes and materials, the drill generates too much torque for the operator to continue drilling and yet hold onto the drill itself. This problem occurs whether the drill uses a conventional auger or planetor type bit. This conventional drill system, put in another way, will drill large holes at a relatively low RPM because of the high torque requirements. The hole is then drilled slower than desired. Other problems occur due to the generation of wood chips by the bit which when larger holes are drilled, the drill bit must be periodically removed and the chips removed to facilitate drilling especially for deep holes. Obviously, in these drilling systems, the generation of chips from the workpiece material means that periodic cleanup is necessary, which adds to the overall job time involved in most situations. It should also be noted that individual drill bits need to be stored separately from the drilling apparatus and in many cases time is expended searching for the proper bit required.

Another set of problems from conventional bits occurs when partial or overlapping holes are desired. To elaborate further on this problem, if a trifolium design is required generated by drilling three overlapping holes, conventional drill bits will produce tears at the overlapped corners. This application occurs especially when holes for large pipes are required. Further, occasionally holes may have to be drilled through more than one plate and then through a sheetrock nailer only partially overlapping the plates. Conventional drill bits will drill through the 2× plates, for example, but then "grab" the sheetrock nailer as it does not fully extend over the drilled hole. The present invention addresses the above mentioned problems and provides a system which reduces or eliminates shortcomings of the prior art.

SUMMARY OF THE INVENTION

The present invention is a hole cutting apparatus for use in combination with a standard drill (hand-held or otherwise) with a conventional drill chuck. The apparatus includes a pilot bit which has a drive screw at one end which is used to make a pilot hole in the workpiece and, at its other end, is adapted to be received by the drill chuck of the standard drill. The pilot drill bit has a small hole toward the end opposite of the drive screw which receives a pin. An adapter plate is provided which is circular in shape having an outer rim and a hole through its middle large enough to receive the pilot bit. An inner rim around the hole through the adapter plate is provided. Small holes in both the outer rim and inner rim which align with the small hole of the pilot bit are made to receive a pin which holds the adapter plate to the pilot bit. The end of the pilot bit opposite the drive screw fits through the hole in the adapter plate, protruding far enough to be held by the drill chuck. With a pilot bit firmly secured to the adapter plate and held by the drill chuck at one of its ends, a drill bit is provided which is generally cylindrical in shape and fits over the pilot bit. One end of the drill bit rests against the inner face of the adapter plate between the inner rim and the outer rim. The drill bit has a slot, preferably T-shaped which receives the pin securing the pilot bit to the adapter plate. When the drill is in operation, the drill bit will be held in place by the pin within this T-shaped slot. At the end of the drill bit opposite the slot is a plurality of cutting teeth. The cutting teeth will engage the workpiece when the apparatus is in motion. Within the framework of this system, various drill bits can be used such as a common 1¼" drill bit and a 3⅞" drill bit. As will be made more readily apparent by subsequent disclosure, the various drill bits may be stored on the pilot bit of the apparatus in a nested fashion, thereby facilitating use of the apparatus.

the workpiece initially with the drive screw which would be placed at the center of the hole to be cut. The drive screw will be driven into the workpiece until the cutting teeth of the drill bit engages the workpiece. The cutting teeth of the workpiece will cut a perimeter slot in the workpiece until the slot extends through the workpiece producing a round slug. The slug and chips produced by the operation of the apparatus are easily removed by a simple twist and pull of the drill bit, producing a release of the pin from the T-shaped slot. Generally, the slug will fall free of the apparatus and the wood chips will remain within the drill bit itself, allowing simplified clean up.

The present invention has several advantages over conventional hole drilling systems. For instance, it does not require the operator to remove the pilot bit to change drill hole sizes. Both the pilot bit and adapter plate stay on the apparatus allowing rapid change of drill bits and thereby saving time. The entire set of drill bits can be stored on the pilot bit and adapter plate reducing time wasted searching for bits. Another advantage of the present invention is that less torque is required to be generated from the drill motor to drill large size holes compared to conventional self-feed auger bits. The present apparatus cuts only a perimeter slot instead of removing the entire hole in chips, making it possible to drill larger holes with hand held drills. For example, a plumber could drill a hole large enough for drain pipes and still be able to hold onto the drill motor. Using a conventional auger or planetary type bit system, the great amount of torque required for a large hole would prevent the operator from holding onto the drill. Coincidentally, with this advantage the bits can be run at a higher RPM because of the low torque required resulting in a hole drilled in a relatively rapid time.

Other less obvious advatages of the present invention are also inherent in the system. For example, in working with large pipes, occasionally partial or overlapping holes are needed. Use of conventional drilling systems will result in tearing of the overlapping corners. Another common problem occurring in construction is that overlapping structures may not completely overlap. For example, two 2× plates will be back to back with a sheetrock nailer overlapping the 2× plate partially. Drilling system using conventional bits will tend to grab the sheetrock nailer after making a hole in the 2× plates. With the present invention, the sheetrock nailer can be drilled even if it does not fully overlap the holes through the 2× plates.

These and other objects and advantages will become more apparent from the following detailed description when taken in conjunction with the attached drawings.

BRIEF DESCRIPTION OF THE DRAWINGS

FIG. 1 is an exploded view in perspective of the apparatus of the present invention.

DESCRIPTION OF THE PREFERRED EMBODIMENT

Referring to FIG. 1, the present invention can be described. FIG. 1 shows a drill set apparatus generally designated as 10 for use with a conventional drill and chuck (not shown). Apparatus 10 has a pilot bit 12 having at one end thereof a drive screw 14. Drive screw 14 is held within pilot bit 12 by a set screw 16 preferably of the allen type. Pilot bit 12 fits through an adapter plate designated as 18. Adapter plate 18 is substantially circular in shape having an outer rim 20 and an inner rim 22. Inner rim 22 defines an aperture 24 through which pilot bit 12 fits during use of the apparatus 10. The end of pilot bit 12 opposite of the drive screw 14 can be designated as 26 and fits through the aperture 24 within adapter plate 18. End 26 of pilot bit 12 is designed to be held by a conventional drill chuck (not shown). Adapter plate 18 and pilot bit 12 are fastened together by a pin 28, through hole 30 in the outer rim 20 of adapter plate 18, hole 32 in the inner rim 22 of adapter plate 18, and hole 34 in pilot bit 12. Two examples of drill bits 36 and 38 are shown in FIG. 1. Drill bit 36 represents a 1¼″ drill bit, while drill bit 38 represents a 2⅞″ drill bit. Drill bit 36 and 38 are hollow and have a substantially circular cross section. In practice, one of these bits 36, for example, fits over pilot bit 12. Slot 40 in drill bit 36 receives pin 38 and is held in place within that roughly T-shaped slot 40. Drill bit 38 also has a T-shaped slot 42 which corresponds to slot 40 of drill bit 36. Drill bit 36 has a plurality of cutting teeth generally designated as 44. Correspondingly, drill bit 38 has a plurality of cutting teeth generally designated as 46. It can be seen from inspection of the cutting teeth 44 of drill bit 36, that these teeth will form a circular perimeter slot until the slot extends through the workpiece and the desired hole is formed.

Prior to operation, both drill bits 36 and 38 can be stored in a nested manner over pilot bit 12. Pilot bit 12 can be pinned to adapter plate 18 by pin 28, thereby making a compact, easily transportable drilling system. In operation, assuming entire disassembly of the apparatus, the end 26 of pilot bit 12 would be secured in a conventional drill chuck (not shown). Adapter plate 18 can be slipped over pilot bit 12 and pin 28 used to secure the pilot bit 12 to adapter plate 18. Drive screw 14 can be set in place with set screw 16. At this point, drill bit 36 can be slipped over pilot bit 12 and held in place by allowing pin 28 to fit within slot 40. When the drill motor is activated, drive screw 14 can be located on the center of the hole to be cut. The drive screw 14 will be driven slightly into the workpiece as the drive screw protrudes from the pilot bit 12 and from the drill bit 44 which fits over the pilot bit 12. As the drive screw 14 is driven into the workpiece, the apparatus is fixed in place. At this time, the drive teeth 44 begin to engage the workpiece forming a circular slot in the workpiece until the slot extends through the workpiece thereby producing the desired hole.

After the hole is formed, the wood slug can be removed in one piece and any chips generated by the drilling operator will remain within the drill bit 36. Drill bit 36 can be removed by simply rotating it relative to the adapter plate 18 and pulling it over the pilot bit 12. If a different drill bit is required for further operation such as drill bit 38, that bit 38 can be fit over pilot bit 12 and secured to the adapter plate 18 by twisting the drill bit 38 such that pin 28 fits within the T-shaped slot 42.

The invention may be embodied in other forms without departing from the spirit or essential characteristics thereof. The present embodiments are therefore to be considered in all respects as illustrative and not restrictive, the scope of the invention being indicated by the appended claims rather than the foreging description, and all change which comes within the meaning and range of equivalency of claims are intended to be embraced therein.

What I claim is:

1. In combination with a drill motor having a drill chuck connected thereto, apparatus for drilling a hole in a workpiece comprising
   a. a pilot bit having a drive screw disposed in one end thereof, said drive screw partially protruding from said pilot bit, said pilot bit having a hole therein at the end thereof opposite said drive screw, said pilot bit adapted to being received by the drill chuck;
   b. an adapter plate substantially circular in shape having an outer rim with a hole therein, and an inner rim defining an aperture to receive said pilot bit, said inner rim having a hole therein;
   c. a pin for securing said pilot bit to said adapter plate, said pin adapted to fit through said hole in the outer rim of said adapter plate, said hole in the inner rim of said adapter plate and said hole in said pilot bit whereby said pilot bit is secured to said adapter plate; and
   d. a drill bit adapted to fit over said pilot bit, said drill bit having a slot therein, said slot adapted to receive said pin whereby said pin secures said drill bit to said adapter plate.

2. The apparatus of claim 1 wherein said drill bit has a plurality of cutting teeth at the perimeter of one end of said drill bit whereby said cutting teeth drill a perimeter slot through the workpiece when the drill motor is activated and said plurality of cutting teeth are engaged with the workpiece.

3. In combination with a drill motor having a drill chuck, apparatus for drilling a hole in a workpiece comprising
   a. a pilot bit having a drive screw disposed therein and partially protruding from said pilot bit, said pilot bit adapted to being received by tile drill chuck;
   b. an adapter plate having an aperture to receive said pilot bit;

c. fastening means for securing said pilot bit to said adapter plate;
d. a drill bit adapted to fit over said pilot bit and be fastened to said adapter plate by said fastening means, said drill bit having a slot therein, said slot adapted to receive said fastening means whereby said fastening means secures said drill bit to said adapter plate, said drill bit having a plurality of cutting teeth at its perimeter whereby said cutting teeth drill a perimeter slot through the workpiece when the drill motor is activated and said cutting teeth are engaged with the workpiece.

4. The apparatus of claim 3 wherein said slot of said drill bit is substantially T-shaped.

5. The apparatus of claim 3 wherein said adapter plate is substantially circular in shape having an outer rim with a hole therein to receive said fastening means, and an inner rim defining said aperture, said inner rim having a hole therein to receive said fastening means.

6. The apparatus of claim 3 wherein said pilot bit has a hole therethrough to receive said fastening means whereby said pilot bit is secured to said adapter plate.

7. The apparatus of claim 3 wherein said fastening means for securing said pilot bit to said adapter plate is a pin.

* * * * *